Aug. 15, 1939.   M. ARNDT   2,169,910
SOUND RECORDING SYSTEM
Filed July 31, 1936
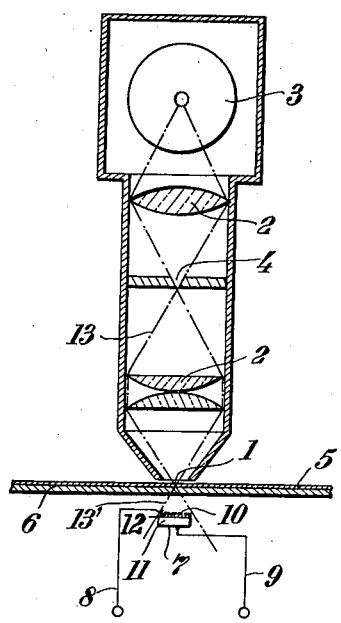
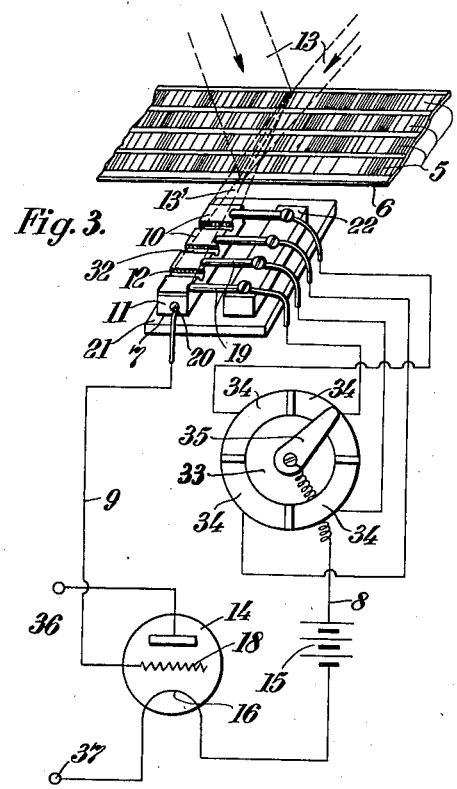
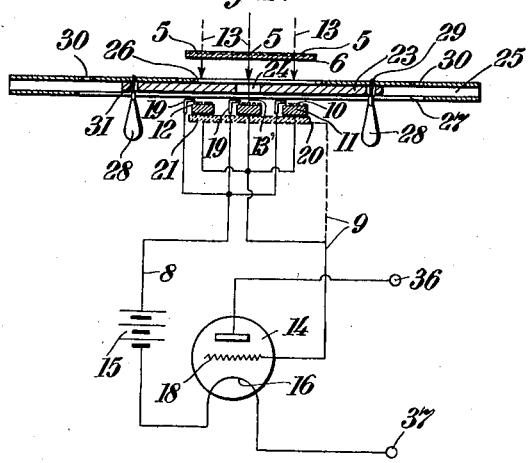
Inventor:
MAX ARNDT
By *Karl Rau*
Attorney Patented Aug. 15, 1939

2,169,910

UNITED STATES PATENT OFFICE 2,169,910

SOUND RECORDING SYSTEM

Max Arndt, Berlin, Germany

Application July 31, 1936, Serial No. 93,595
In Germany March 21, 1936

6 Claims. (Cl. 179—100.3)

This invention relates to a system for the scanning of sound tracks with light-sensitive electric cells of the kind known as barrier layer photo-cells. It is the object of the invention to render possible in a simple way the scanning of a plurality of parallelly arranged sound tracks. Another object of the invention is to facilitate the manufacture, mounting and adjustment of the photo-cells required for this purpose.

Still another object is to reduce the physical size and to improve the efficiency and sound quality of the barrier layer cells.

According to the invention the sound tracks are all lighted from a common source of light by a light stroke formed by a mechanical slot provided in an optical device, the scanning of the sound being effected by a photoelectric cell or cell aggregate arranged closely behind the film; this photo-electric cell is of the kind working with a barrier layer or boundary layer, consisting of a semi-conductor such as selenium or cuprous oxide ($Cu_2O$) which is deposited on a metal base plate forming one electrode and exposed to the light through a light-pervious metal grid forming the counterelectrode such cells hereinafter being referred to as "barrier layer cells" or "boundary layer cells" for the purpose of this specification. In such barrier layer cells as known per se an electromotive force is produced in the boundary layer between the semi-conductor layer and the metal grid, but according to the invention an additional voltage change can be effected by inserting an additional source of current into the cell circuit, thus causing a variable voltage drop in the semi-conductor, the resistance of which is changed by exposing it to light. Such a barrier layer cell is arranged behind each sound track, i. e., either mechanically and electrically independent or only electrically independent but forming a mechanical unit. In the latter case the cell aggregate consists of a common metal base plate, for example of iron, the surface of which is arranged parallelly to the sound carrier, and on which the semi-conductor, for example selenium, is applied in sections which are preferably separated from one another and on which the light-pervious counterelectrodes are placed which are likewise separated from one another. This system of barrier layer cells can be produced in such a way that a barrier layer cell of the construction known per se is provided with incisions or notches which cut the light-pervious metal layer (light grid) forming the counterelectrodes and the semi-conductor coating with the boundary layer into sections, thus forming single barrier layer areas, the shape and size of which can be chosen as desired: The system may be of such kind that the common metal base plate forms one pole and each of the plurality of counterelectrodes formed by the separating grooves forms a counter pole which can be individually and alternatively switched in or out. It is advantageous to provide the separating grooves in or between the cell layers parallelly and at right angles to the travelling direction of the sound tracks and to arrange the grooves running parallel to the travelling direction of the sound track in the position corresponding to the intermediate space between the parallel sound tracks.

The cell system possesses very small dimensions and its surface (metal grid) is situated parallelly behind the film with the sound tracks the number of which corresponds to the number of single cells or cell sections. The scanning light beam is provided to cover the whole surface of the cell system by dimensioning the surface of the total cell system including the intermediate spaces between the cell elements so as to coincide with the projection of the light beam on the cell surface.

The arrangement is so chosen that the boundary lines of the light pyramid or prism formed by the light beam diverging behind the film and having approximately rectangular cross section approximately coincide with the outer borders of the cell system, the upper edge of the light pyramid formed by the light beam lying in the plane of the sound records if the lens system is duly adjusted to be in focus. The total surface of the single cell element is preferably smaller than 10 mm$^2$.

It is very important to utilize fully the amount of light available from the light source for each one element, because in case of several parallel sound tracks only the portion of light passing through one sound track can effect a lighting of the cell element situated behind it. Of course, the light intensity of the lamp immediately before the film is very considerable. However a considerable portion of the light is absorbed by the film and more particularly by its photographic layer so that the fullest but most economical lighting of the single cell element is of great importance. In addition, high quality of sound reproduction is only attainable if the single cell element is fully covered by the light, in other words if the portions at the border are also lighted. Any portion of the cell surface which is not lighted forms a short-circuit for the electromotive force produced in the lighted portion of the cell so that thereby a considerable reduction of quality and efficiency is caused. The construction and arrangement of the cell behind the film, properly positioned within the light pyramid results in lowest self capacities and highest self-resistance and thus in increased efficiency, a maximum of quality and highest light intensity.

Each single counterelectrode of the cell group may be connected with each one contact point of an electric switch, while the metal base plate of the cell aggregate is connected with the center contact of the switch over the consuming device, for instance an amplifier, this kind of switching being preferable in case the cell aggregate forms a physical unit of electrically independent single cell elements. Also the single cell elements may be switched in and out by a mechanical screen or diaphragm which is arranged at a short distance before or behind the film and is transversely movable, this kind of switching being preferable if the cell elements are not only electrically but also physically independent structures. In this case all base plate and counterelectrode leads can be simultaneously connected to the grid or the cathode respectively of a common amplifier tube.

So far the barrier layer cells could not be practically used for the scanning of sound records in view of the high self-capacity, which short-circuits the high frequencies in the cell itself and on the other hand owing to the fact that the self-resistance of this kind of cell is too low for coupling it to the inlet grid of an amplifier tube. According to the invention these disadvantages are removed by using extremely small cell elements for the purpose of attaining minimum self capacities, the total surface of these elements being fully lighted, simultaneously avoiding any loss of light, so as to increase the specific light intensity per unit surface area. The arrangement of the barrier layer cells according to the invention, forming a physical unit separated into electrically independent elements renders it possible to arrange a mechanical cell unit directly behind a sound carrier with any desired number of sound tracks. The adjustment and the supporting of the cells behind the sound carrier is thus extremely simple. In this connection, the fact is very important that if using each one cell unit behind each sound track it is very difficult to obtain uniform sensitivity from all cells, moreover a plurality of single cells behind a sound carrier with many sound tracks requires elaborate supporting devices, whereby moreover the disadvantage is resulting that the cells have to be mutually displaced if they are not made so small as suggested by the present invention. If using a common metal base plate for the cell aggregate there results a physical unit of electrically independent structures. All cell elements formed by the incisions or notches in the covering layers of the common plate possess equal electromotive forces. The common metal base plate forms a common electrode while the light-pervious metal layers covering the semi-conductor form independent counterelectrodes. The electric circuit for this aggregate of barrier layer cells may be such that the common base plate (iron, copper or the like) is connected for instance to the grid of the inlet tube of an amplifier while the circuit is closed in each case by that counterelectrode the appertaining sound track of which is to be scanned.

Although the cell aggregate according to the invention is particularly adapted for sound carriers with several sound records, such as used for example in the light phonograph, it can be used with equal success for any other purpose, for instance for the scanning of measured curves. The electrical or optical switching for connecting that cell element which is situated under the sound track which is just to be scanned, is very simple and reliable in construction and operation. The switching of the electrical switch or of the mechanical diaphragm may be automatically effected by marks applied on or in the sound carrier, for example in such a way that a corresponding mark on the sound carrier inserts the next following cell element into the circuit thus automatically effecting the cutting out of the cell element which was just in operation. This switching process is very simple in case of the cell aggregate forming a physical unit, because the elements require uni-polar switching in or out only.

The efficiency of the arrangement according to the invention may be further increased by inserting an auxiliary source of current of for example 3–10 volts between the cell layer effecting the photo-electric effect and the cell plate. In this case it is useful to connect the positive potential with the cell layer and the negative potential with the cathode of the amplifier tube, while the grid of the tube is connected with the cell plate. By this step both light-electric phenomena, i. e., the photo-electric current resulting in the boundary layer and the change of resistance resulting under the influence of the light in the cell layer, for instance consisting of selenium, can be utilised together to get a summarizing effect. To attain this effect, it is necessary to connect the auxiliary source of current in such a way that the gain of current due to reduction of resistance has the same direction as the light-electric current.

Further objects and particulars of the invention will be clear from the following detailed description in connection with the accompanying drawing, showing some embodiments of the invention and in which:

Fig. 1 is a lateral cross-section through the sound scanning device.

Fig. 2 is a longitudinal cross section of the arrangement shown in Fig. 1, using a cell aggregate of physically and electrically independent barrier layer cells.

Fig. 3 is a perspective diagram of the arrangement shown in Fig. 1, using a cell aggregate of barrier layer cells forming a physically coherent unit, being only electrically separated.

According to Fig. 1 the light beam 1 serving for scanning the sound record is produced by an optical reducing system 2 as known per se, this optical system effecting a sharp and extremely narrow projection of the slot 4 lighted from a lamp 3, on the sound tracks 5 of the sound carrier 6, for example a film. This optical slot system may be constructed in the form of a tube in known manner. The aggregate of barrier layer cells 7 is arranged at a short distance behind the film 6. The voltages produced in the cell are supplied to the loudspeaker through the leads 8 and 9, preferably over an amplifier tube. The lead 8 is connected with the metal grid or the light pervious metal layer 10 and the lead 9 to the cell plate 11. The cell layer 12, for example selenium, cuprous oxide or the like is situated between the light grid 10 and the cell plate 11, this cell layer 12 being influenced by the incoming light and thereby changing its resistance, thus forming a variable voltage drop of the current produced by the additional source of current and producing an own electromotive voltage in the boundary layer formed together with the grid 10.

The light rays 13 diverge behind the sound track 5 and form a kind of light pyramid the upper edge of which is formed by the light stroke 1 effecting the sound scanning. The cell aggregate 7 is so arranged that the light rays 13' limiting the light pyramid approximately coincide with the outer borders of the surface of the cell aggregate 7.

Preferably an amplifier is inserted into the circuits 8 and 9. In Figs. 2 and 3 the circuit is diagrammatically shown with an amplifier tube 14, using an auxiliary source of current 15. This auxiliary source of current 15 is so inserted into the cell circuit 8 that the positive potential is connected to the metal grid 10 and the negative potential is connected to the cathode 16 of the amplifier tube 14. The metal plate or plates 11 of the cell aggregate 7 are connected to the grid 18 of the tube 14. The terminal of the metal grid 10 of the cell aggregate 7 may be formed by surface contacts 19 which preferably bear only quite close to the border of the cell, for example under spring pressure, as shown diagrammatically in Fig. 3. The connection with the circuit 9 may be effected by soldering or by pressing the contact portions against the cell plate 11. These cell plates 11 having a common potential, it is also possible to provide the connection 20 at a common metal base plate 21 of the cell aggregate 7. In this case the holder 22 of the contacts 19 consists of insulating material, such as shown in Fig. 3. If using single cell elements 7 corresponding to Fig. 2 the common base plate 21 simultaneously serves as a support for the cell elements 7, as shown in Fig. 3.

In case of the arrangement as per Fig. 2 the single sound tracks 5 on the film 6 are switched in and out by a mechanical diaphragm 23 which possesses an opening 24 corresponding to one sound track 5. The slide or gate 23 of the diaphragm is supported in a suitable guiding frame 25 which is provided with an upper opening 26 the width of which corresponds to that of one of the sound tracks 5. This opening 26 may possess ribs corresponding to the intermediate spaces between the single sound tracks 5. A longitudinal slot 27 is provided on the lower side of the guiding frame 25, thus rendering it possible to freely move the operating handles 28 or the like in longitudinal direction. The diaphragm 24 can be fixed in the desired position by rest points, for example by providing the handles 28 to be cut in and out, with a nose 29 engaging into corresponding holes 30 of the upper side of the guiding frame 25. The handles 28 may be so arranged under action of a spring 31 that the pins 29 always snap in as soon as they are positioned over a hole 30. If this mechanical switching device is used the light grid leads (circuit 8) and the leads from the metal base plate of the cells (circuit 9) may remain simultaneously inserted in the cathode circuit or the grid circuit respectively. If using a common metal base plate 21, the circuit 9 may be directly connected to the common base plate at the point 20.

According to Fig. 3 the cell aggregate 7 forms a physical unit. This cell aggregate 7 may be obtained in such a way that a cell extending over the whole width of the film possesses notches 32 running parallel to the sound tracks, separating the semi-conductor layer 12 into sections and extending into the metal 11. The width of the notches 32 may correspond to the distance between two sound tracks 5. The dimensions of the cell aggregates can be further reduced if an additional optical system for concentrating or condensing the light is provided between the film 6 and the cell aggregate 7. The smaller these dimensions the better is the output regarding efficiency and quality. Care should always be taken that the light pyramid formed by the diverging light rays 13' coincides with the outer borders or edges of the cell, as indicated in Fig. 3 in dotted lines. This applies also to the device shown in Fig. 2.

In the device as per Fig. 3 the sound track 5 to be scanned is selected by means of an electric switch 33 which may for example be constructed as a rotary switch. The single terminals 19 of the light grid 10 are in this case connected with the single poles 34 of the switch 33 while the slider 35 is preferably connected with the cathode 16 of the amplifier tube 14 over the auxiliary source of current 15. It is thus effected that depending on the position of the slider 35 that sound track 5 is scanned the appertaining cell element of which is connected with the reproducing device over the switch 33. It is obvious that in case of the arrangement according to Fig. 2 any desired number of sound tracks 5 corresponding to the number of cell elements and switch positions may be provided on the film 6. This applies in a similar way to the arrangement according to Fig. 2.

The terminals 36 and 37 of the valve diagram may be connected through further amplifier tubes with the loudspeaker, taking due care to choose the suitable circuit diagram.

Apart from the advantages of the invention explained above as regards increase of quality and efficiency of the scanning device according to the invention such a cell aggregate of electrically independent cell elements offers the further advantage that in case one cell element becomes defective, the reproducing device remains operative in regard to the remaining sound tracks. The operation of the device as regards switching over from one sound track to the other is very simple both in case of the device using a mechanical diaphragm and in case of the device using an electric switch.

I claim:

1. Apparatus for scanning a plurality of parallel optical sound tracks arranged on a carrier strip, comprising a lens system including a physical light slit, a source of light for illuminating all the sound tracks through said slit, and a photoelectric device comprising a common metal base plate arranged parallel to said strip, a light-sensitive layer applied to said base plate in sections separated from one another, and light pervious counterelectrodes applied to said sections to form an aggregate of barrier layer photoelectric cell units each arranged for cooperation with one of said sound tracks.

2. Apparatus for scanning a plurality of parallel optical sound tracks arranged on a carrier strip, comprising a lens system including a physical light slit, a source of light illuminating all the sound tracks through said slit, and a barrier layer cell arranged close to said strip at the side opposite from said lens system, said cell being provided with incisions to form single separate cell elements, each of said elements being arranged for cooperation with one of said sound tracks.

3. Apparatus for scanning a plurality of parallel optical sound tracks on a film strip, comprising a physical light slit, a source of light and an optical system for illuminating all the sound tracks through said slit, and a light-sensitive cell aggregate arranged closely behind and parallel to said film, said cell aggregate including a barrier layer cell having separating grooves running parallel to and at right angles to the direction of travel of said sound tracks, whereby the active portion of said cell is subdivided into electrically independent cell units, the separating grooves running parallel to the direction of travel of the sound tracks being arranged so as to be exposed to the light rays passing through the intermediate film portions between adjacent sound tracks, the cross-sectional area of said light beam at the surface of said cell units coinciding with the total active surface of said cell aggregate.

4. Apparatus for scanning a plurality of parallel optical sound tracks on a film strip, comprising a physical light slit, a source of light and an optical system for illuminating all the sound tracks through said slit, and a light-sensitive cell aggregate arranged closely behind and parallel to said film strip, said cell aggregate including a plurality of electricially independent cell elements forming a mechanical unit, each cell element being coordinated to one sound track and being of such size that its active surface coincides with the cross-sectional area at the cell surface of the respective portion of the light beam passing from said source through said slit and the coordinated sound track.

5. Apparatus for scanning a plurality of parallel optical sound tracks arranged on a common carrier strip, comprising a physical slit, a source of light and an optical system for illuminating all the sound tracks through said slit, and a barrier layer cell aggregate comprising a common base electrode carrying a plurality of isolated light-sensitive layers covered by light pervious counterelectrodes to form a plurality of electrically independent cell units, and an electric switch comprising a central contact member connected with the metallic base electrode of said cell, and a plurality of cooperating contacts each connected to one of said counterelectrodes of said cell units.

6. Apparatus for scanning a plurality of parallel optical sound tracks arranged on a common carrier strip, comprising a physical light slit, a source of light and an optical system for illuminating all the sound tracks through said slit, a barrier layer cell aggregate, comprising a plurality of electrically independent cell elements each arranged for cooperation with one of said sound tracks, and a transversely movable diaphragm adapted to screen off all but a definite portion of the light beam projected on said cell aggregate, for individually scanning one of said sound tracks, and a common amplifier, all of said cell elements being permanently connected with the input of said amplifier tube.

MAX ARNDT.